United States Patent
Bush et al.

(10) Patent No.: US 8,252,866 B2
(45) Date of Patent: Aug. 28, 2012

(54) AZETIDINIUM-FUNCTIONAL POLYSACCHARIDES AND USES THEREOF

(75) Inventors: Michael J. Bush, Spokane, WA (US); John B. Hines, Atlanta, GA (US); James T. Wright, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 122 days.

(21) Appl. No.: 12/738,661

(22) PCT Filed: Oct. 17, 2008

(86) PCT No.: PCT/US2008/080288
§ 371 (c)(1),
(2), (4) Date: Jul. 15, 2010

(87) PCT Pub. No.: WO2009/052362
PCT Pub. Date: Apr. 23, 2009

(65) Prior Publication Data
US 2010/0294725 A1    Nov. 25, 2010

Related U.S. Application Data

(60) Provisional application No. 60/981,227, filed on Oct. 19, 2007.

(51) Int. Cl.
*A61K 47/48* (2006.01)
*C08G 63/48* (2006.01)
*C08G 63/91* (2006.01)
*C08B 31/00* (2006.01)
*C08L 71/00* (2006.01)
*C08L 71/02* (2006.01)
*C08L 77/00* (2006.01)

(52) U.S. Cl. ............... 525/54.2; 525/430; 525/54.24

(58) Field of Classification Search .......... 210/730, 210/702; 525/54.2, 54.24, 430
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,372,086 A | 3/1968 | Westfall et al. | |
| 3,607,622 A | 9/1971 | Espy | |
| 3,644,171 A | 2/1972 | Bevan et al. | |
| 3,734,977 A | 5/1973 | Coscia et al. | |
| 3,914,155 A | 10/1975 | Horowitz | |
| 3,949,014 A | 4/1976 | Maki et al. | |
| 4,152,199 A * | 5/1979 | Hamerstrand et al. | 162/164.6 |
| 4,233,411 A | 11/1980 | Ballweber et al. | |
| 4,339,331 A | 7/1982 | Lim et al. | |
| 4,585,475 A | 4/1986 | Fosnacht | |
| 4,722,964 A | 2/1988 | Chan et al. | |
| 4,902,442 A | 2/1990 | Garces | |
| 4,915,766 A | 4/1990 | Baxter | |
| 5,049,612 A | 9/1991 | Bulatovic et al. | |
| 5,459,181 A | 10/1995 | West et al. | |
| 5,585,456 A | 12/1996 | Dulany et al. | |
| 6,179,962 B1 * | 1/2001 | Brady et al. | 162/164.1 |
| 2003/0199629 A1 | 10/2003 | Gelman et al. | |
| 2004/0144510 A1 | 7/2004 | Mauler | |
| 2007/0000839 A1 | 1/2007 | Wright et al. | |
| 2007/0054144 A1 | 3/2007 | Dopico et al. | |

FOREIGN PATENT DOCUMENTS

| | | |
|---|---|---|
| AU | 633726 B2 | 2/1993 |
| EP | 1180559 A1 | 2/2002 |
| FR | 2050759 A5 | 4/1971 |
| WO | 99/06469 A1 | 2/1999 |
| WO | 99/34058 A1 | 7/1999 |
| WO | 00/09806 A2 | 2/2000 |
| WO | 2007/008945 A1 | 1/2007 |

OTHER PUBLICATIONS

Laskowski, J., Coal Flotation and Fine Coal Utilization, Developments in Mineral Processing, Chapter 5, vol. 14, 2001.
Wert, E., et al., Pilot Plant Testing of Dissolved Air Flotation for Algae and Arsenic Removal, Southern Nevada Water Authority, Boulder, City, NV, USA. Proceedings—Water Quality Technology Conference, p. 902-18 (2003).
CQ, Inc., Coal Cleaning Primer, found at http://cq-inc.com/Coal_Primer.pdf, (1999).
International Search Report and Written Opinion of the Search Authority of PCT/US2008/080288 mailed Jun. 23, 2009.

* cited by examiner

*Primary Examiner* — Christopher Upton
*Assistant Examiner* — Nader Hossaini
(74) *Attorney, Agent, or Firm* — Ram W. Sabnis

(57) ABSTRACT

The present invention relates to polysaccharides that have been modified by providing azetidinium functionality thereto. Such functionality can be provided by crosslinking a polysaccharide with a resin having azetidinium functional groups. In one or more aspects, the polysaccharide can comprise one or more of starch, guar gum, alginate or derivatives thereof. Polysaccharides having azetidinium functionality according to the present invention are suitable for multiple uses. Such uses include, but are not limited to, removal of one or more solid materials from a liquid, beneficiation of an ore, removal of metallic ions from a liquid; providing oil from bitumen; and removal of mercury from synthetic gypsum. Other uses of the functionalized polysaccharides of the present invention include hydroseeding, dust control and erosion control.

19 Claims, No Drawings

US 8,252,866 B2

AZETIDINIUM-FUNCTIONAL POLYSACCHARIDES AND USES THEREOF

RELATED APPLICATIONS

This application claims the benefit of the filing date of U.S. Provisional Patent Application No. 60/981,227, filed Oct. 19, 2007, which is herein incorporated by reference in its entirety.

FIELD OF THE INVENTION

The present invention relates to polysaccharides that have been modified by imparting azetidinium functionality thereto. Such functionality can be provided by crosslinking a polysaccharide with a resin having azetidinium functional groups. In one or more aspects, the polysaccharide can comprise one or more of starch, guar gum, alginate or derivatives thereof. Polysaccharides having azetidinium functionality according to the present invention are suitable for multiple uses. Such uses include, but are not limited to, removal of one or more solid materials from a liquid, beneficiation of an ore; removal of metallic ions from a liquid; providing oil from bitumen; and removal of mercury from synthetic gypsum. Other uses of the functionalize polysaccharides of the present invention include hydroseeding, dust control and erosion control.

BACKGROUND OF THE INVENTION

Various polysaccharides such as cellulose, starch, and guar gum have been used as binders of components in solid and aqueous media. Such binders can be selected for their biodegradable properties, which can be beneficial for uses such as hydroseeding and other agricultural or erosion control applications.

Hydroseeding involves the binding of seeds to materials such as fertilizer, mulch, and other ingredients that can be incorporated into a desired "microclimate" for the improved spreading and germination of the seeds. Polysaccharide compositions such as slurries containing fibrous additives, with or without seeds, may also be sprayed onto mulch, wood chips, hay, straw, or other plant fibers, to hold these substrates into place and thereby assist in reducing erosion over a ground area. In another exemplary application, biodegradable landfill covers may be formed by spraying garbage piles with polysaccharide binder compositions.

The effectiveness of polysaccharide-based binders in these and other applications, however, can be limited due to their high water solubility and reduced mechanical strength upon contact with moisture (e.g., from rain or moist soil). For this reason, attempts have been made to cross link polysaccharides to render them less soluble or insoluble and thereby slow their degradation rate, without also preventing their ultimate conversion into harmless byproducts, namely carbon dioxide and water.

For example, metal-based cross linking agents for promoting the gellation of natural polysaccharide gums in aqueous systems have been used in the oil well drilling for the rheology control of oil well drilling fluids. These agents are described in U.S. Pat. No. 3,644,171 (the disclosure of which is incorporated by reference in its entirety) but rely, however, on the heavy metals antimony and chromium, which are undesirable from an environmental standpoint. U.S. Pat. No. 5,459,181 (the disclosure of which is incorporated by reference in its entirety) describes the use of other catalyst systems (e.g., ammonium sulfate) to catalyze the cross linking of a water soluble polysaccharide such as guar gum or hydroxyethyl cellulose with an amine formaldehyde condensate prepolymer (e.g., dimethylol urea). Other known polysaccharide cross linking agents include metallic catalysts such as ammonium zirconium carbonate which, again, lead to the deposition of unwanted metals in the soil and other areas to which they become exposed.

There remains a need for biodegradable binders for solid components, and in particular polysaccharide binders that are cross linked to decrease water solubility. Ideally, these binders should not rely on heavy metal catalysts or other cross linking agents that lead to the release of undesirable contaminants such as antimony, chromium, zirconium, and/or formaldehyde into the environment. Such binders would be applicable for uses described above (e.g., hydroseeding) as well as in other areas where cross linked polysaccharides having improved strength and a reduced tendency to solubilize or hydrolyze in aqueous media are desirable. Other types of solid components that might be advantageously bound with polysaccharide binders include mill scale particles and even dust particles and other fine solid materials in the mitigation of airborne particulates.

Industrially, processes for the purification of liquid suspensions or dispersions (and especially aqueous suspensions or dispersions) to remove suspended solid particles have been prevalent. Froth flotation, for example, is a separation process based on differences in the tendency of various materials to associate with rising air bubbles. Additives are often incorporated into the froth flotation liquid (e.g., aqueous brine) to improve the selectivity of the process. For example, "collectors" can be used to chemically and/or physically absorb onto mineral(s) (e.g., those comprising value metals) to be floated, rendering them more hydrophobic. On the other hand, "depressants," typically used in conjunction with collectors, render other materials (e.g., gangue minerals) less likely to associate with the air bubbles, and therefore less likely to be carried into the froth concentrate.

In this manner, some materials (e.g., value minerals or metals) will, relative to others (e.g., gangue materials), exhibit preferential affinity for air bubbles, causing them to rise to the surface of the aqueous slurry, where they can be collected in a froth concentrate. A degree of separation is thereby affected. In less common, so-called reverse froth flotations, it is the gangue that is preferentially floated and concentrated at the surface, with the desired materials removed in the bottoms. Gangue materials typically refer to quartz, sand and clay silicates, and calcite, although other minerals (e.g., fluorite, barite, etc.,) may be included. In some cases, the material to be purified comprises predominantly such materials, and the smaller amounts of contaminants are preferentially floated. For example, in the beneficiation of kaolin clay, a material having a number of industrially significant applications, iron and titanium oxides can be separated by flotation from the impure, clay-containing ore, leaving a purified kaolin clay bottoms product.

The manner in which known collectors and depressants achieve their effects is not understood with complete certainty, and several theories have been proposed to date. Depressants, for example may prevent the gangue minerals from adhering to the value materials to be separated, or they may even prevent the collector(s) from absorbing onto the gangue minerals. Whatever the mechanism, the ability of a depressant to improve the selectivity in a froth flotation process can very favorably impact its economics.

Overall, froth flotation is practiced in the beneficiation of a wide variety of value materials (e.g., mineral and metal ores and even high molecular weight hydrocarbons such as bitumen), in order to separate them from unwanted contaminants that are unavoidably co-extracted from natural deposits. In the case of solid ore beneficiation, the use of froth flotation generally comprises grinding the crude ore into sufficiently small, discrete particles of a value mineral or metal and then contacting an aqueous "pulp" of this ground ore with rising air bubbles, typically while agitating the pulp. Prior to froth flotation, the crude ore may be subjected to any number of preconditioning steps, including selective crushing, screening, desliming, gravity concentration, electrical separation, low temperature roasting, and magnetic differentiation.

Another particular froth flotation process of commercial significance involves the separation of bitumen from sand and/or clay, which are ubiquitous in oil sand deposits, such as those found in the vast Athabasca region of Alberta, Canada. Bitumen is recognized as a valuable source of "semi-solid" petroleum or heavy hydrocarbon-containing crude oil, which can be upgraded into many valuable end products including transportation fuels such as gasoline or even petrochemicals. Alberta's oil sand deposits are estimated to contain 1.7 trillion barrels of bitumen-containing crude oil, exceeding the reserves in all of Saudi Arabia. For this reason, significant effort has been recently expended in developing economically feasible operations for bitumen recovery, predominantly based on subjecting an aqueous slurry of extracted oil sand to froth flotation. For example, the "Clark Process" involves recovering the bitumen in a froth concentrate while depressing the sand and other solid impurities.

Various gangue depressants for improving froth flotation separations are known in the art and include sodium silicate, starch, tannins, dextrins, lignosulphonic acids, carboxylmethyl cellulose, cyanide salts and many others. More recently certain synthetic polymers have been found advantageous in particular beneficiation processes involving froth flotation. Overall, despite the large offering of flotation depressants and dewatering agents in the art, an adequate degree of refinement in many cases remains difficult to achieve, even, in the case of froth flotation, when two or more sequential "rougher" and "cleaner" flotations are employed. There is therefore a need in the art for agents that can be effectively employed in a wide range of separation processes, including both froth flotation and the separation of solid contaminants from liquid suspensions.

Other processes, in addition to froth flotation, for the separation of solid contaminants from liquid suspensions can involve the use of additives that either destabilize these suspensions or otherwise bind the contaminants into larger agglomerates. Coagulation, for example, refers to the destabilization of suspended solid particles by neutralizing the electric charge that separates them. Flocculation refers to the bridging or agglomeration of solid particles together into clumps or flocs, thereby facilitating their separation by settling or flotation, depending on the density of the flocs relative to the liquid. Otherwise, filtration may be employed as a means to separate the larger flocs.

The additives described above, and especially flocculants, are often employed, for example, in the separation of solid particles of rock or drill cuttings from oil and gas well drilling fluids. These drilling fluids (often referred to as "drilling muds") are important in the drilling process for several reasons, including cooling and lubricating the drill bit, establishing a fluid counterpressure to prevent high-pressure oil, gas, and/or water formation fluids from entering the well prematurely, and hindering the collapse of the uncased wellbore. Drilling muds, whether water- or oil-based, also remove drill cuttings from the drilling area and transport them to the surface. Flocculants such as acrylic polymers are commonly used to agglomerate these cuttings at the surface of the circulating drilling mud, where they can be separated from the drilling mud.

Other uses for flocculants in solid/liquid separations include the agglomeration of clays that are suspended in the large waste slurry effluents from phosphate production facilities. Flocculants such as anionic natural or synthetic polymers, which may be combined with a fibrous material such as recycled newspaper, are often used for this purpose. The aqueous clay slurries formed in phosphate purification plants typically have a flow rate of over 100,000 gallons per minute and generally contain less than 5% solids by weight. The dewatering (or settling) of this waste clay, which allows for recycle of the water, presents one of the most difficult problems associated with reclamation. The settling ponds used for this dewatering normally make up about half of the mined area, and dewatering time can be on the order of several months to several years.

In the separation of solids from aqueous liquids, other specific applications of industrial importance include the filtration of coal from water-containing slurries (i.e., coal slurry dewatering), the processing of sewage to remove contaminants (e.g., sludge) via sedimentation, and the processing of pulp and paper mill effluents to remove suspended cellulosic solids. The dewatering of coal poses a significant problem industrially, as the BTU value of coal decreases with increasing water content. Raw sewage, both industrial and municipal, requires enormous processing capacity, as wastes generated by the U.S. population, for example, are collected into sewer systems and carried along by approximately 14 billion gallons of water per day. Paper industry effluent streams likewise represent large volumes of solid-containing aqueous liquids, as waste water generated from a typical paper plant often exceeds 25 million gallons per day. The removal of sand from aqueous bitumen-containing slurries generated in the extraction and subsequent processing of oil sands, as described previously, poses another commercially significant challenge in the purification of aqueous liquid suspensions. Also, the removal of suspended solid particulates is often an important consideration in the purification of water, such as in the preparation of drinking (i.e., potable) water. Synthetic polyacrylamides, as well as naturally-occurring hydrocolloidal polysaccharides such as alginates (copolymers of D-mannuronic and L-guluronic acids) and guar gum are conventional flocculants in this service.

The above applications therefore provide several specific examples relating to the purification of aqueous liquid suspensions to remove solid particulates. However, such separations are used in a number of other processes in the mineral, chemical, industrial and municipal waste; sewage processing; and paper industries, as well as in a wide variety of other water-consuming industries. Thus, there is a need in the art for additives that can effectively promote selective separation of a wide variety of solid contaminants from liquid media. Advantageously, such agents should be selective in chemically interacting with the solid contaminants, through coagulation, flocculation, or other mechanisms such that the removal of these contaminants is easily achieved. Especially desirable are additives that are also able to complex unwanted ionic species such as metal cations to facilitate their removal as well.

SUMMARY OF THE INVENTION

In one aspect, the present invention relates to fiunctionalized polysaccharides, More specifically, the present invention relates to polysaccharides that have been modified by imparting azetidinium functionality thereto. Such functionality can be imparted by crosslinking a polysaccharide with a resin having azetidinium functional groups, wherein the composition comprises, for example, from about 0.1 wt % to about 10 wt % polysaccharide dry solids, In one or more aspects, the polysaccharide can comprise one or more of starch, guar gum, alginate or derivatives thereof. Further, the resin can comprise a reaction product of polyamidoamine and halohydrin.

Polysaccharides having azetidinium functionality according to the present invention are suitable for multiple uses. Such uses include, but are not limited to, removal of one or more solid materials from a liquid, beneficiation of an ore; removal of metallic ions from a liquid; providing oil from bitumen; and removal of mercury from synthetic gypsum. Other uses of the functionalize polysaccharides of the present invention include hydroseeding, dust control and erosion control.

These and other aspects of the invention are apparent from the following Detailed Description.

DETAILED DESCRIPTION OF THE INVENTION

The present invention may be understood more readily by reference to the following detailed description of the invention and the examples provided herein. Before the present invention is disclosed and described, it is to be understood that the aspects described below are not limited to specific methods or materials discussed, as such may, of course, vary. It is also to be understood that the terminology used herein is for the purpose of describing particular aspects only and is not intended to be limiting.

As used herein terminology has its ordinary meaning. Exemplary definitions as to terminology used in this patent are given below.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Polysaccharides that may be cross linked with azetidinium-functional resins, include naturally-occurring and synthetic polymers of one or more types of saccharide monomers (e.g., glucose, fructose, galactose, etc.). These polysaccharides typically have at least 10 saccharide residues, and often several thousand residues (e.g., 2,000 to 14,000 residues). They may originate from a wide variety of sources—both natural and synthetic. For example, wood, seaweed, and bacteria, are known sources of the polysaccharides cellulose, alginate, and xanthan gum, respectively. A representative group of polysaccharides therefore includes cellulose and cellulosic polymers, starch, glycogen, amylopectin, guar gum, xanthan gum, dextran, carrageenan, alginate, chitin, chitosan, and hyaluronic acid. Additional "gum" polysaccharides include locust bean, plantago, and others.

The term "polysaccharide" also embraces the known derivatives that are readily obtained through the conversion, to various extents, of pendant hydroxyl groups, for example, to ethers and esters by reaction with alcohols and carboxylic acids, respectively. Similarly, derivatives having acidic groups, amino groups, sulfated amino, and added hydroxyl groups, etc., may be obtained according to known reactions.

The extent to which various polysaccharide derivatives exhibit modified chemical properties, such as solubility and reactivity, is also known. Derivatives of polysaccharides also include their cationic and anionic salt forms. As is known in the art, conversion between two salt forms (e.g., between the soluble sodium or potassium salt forms and the insoluble calcium salt form of alginate) is often readily accomplished through ion exchange. Thus, for simplification of the present disclosure, reference to a particular type of polysaccharide (e.g., cellulose) is meant to embrace its various chemically modified derivatives (e.g., carboxymethyl cellulose, hydroxyethyl cellulose, cellulose acetate, methyl cellulose, etc.).

One particular, representative polysaccharide is a starch. Starches that can be used include various plant carbohydrates, such as barley starch, indian corn starch, rice starch, waxy maize starch, waxy sorghum starch, tapioca starch, wheat starch, potato starch, pearl starch, sweet potato starch, and the like, and derivatives thereof. Example of starch derivatives, often called converted or modified starches, include oxidized starches, hydroxyalkylated starches (e.g., hydroxyethylated corn starch), carboxyalkylated starches, various solubilized starches, enzyme-modified starches, acid-treated starches, thermo-chemically modified starches, etc. Starch derivatives also include the chemically modified forms as discussed above with respect to polysaccharides in general (e.g., etherified or esterified derivatives). Many starch derivatives are cationic, anionic, or amphoteric. Cationic starches include dialdehyde starches, mannogalactan gum, and dialdehyde mannogalactan. Cationic starches may also be obtained from graft polymerization of cationic polymers, such as cationic polyacrylamide, onto the starch. Starches treated by a combination of the aforementioned processes also can be used, as can mixtures of the aforementioned starches.

The requisite azetidinium functional groups, in resins that cross link with the polysaccharide to improve its water resistance and mechanical properties, can be incorporated onto a variety of polymeric structures (i.e., a variety of polymer backbones) including polyethers; polyolefins (e.g., polypropylene); polyacrylamides; polystyrene that may be cross-linked, e.g., with divinylbenzene; polymethacrylate and methacrylate co-polymers. These polymer backbones may themselves be polysaccharides (e.g., agarose or cellulose). Such azetidinium-functional resins are generally known to exhibit strong anion exchange capacity and are commercially available from a number of suppliers including Georgia-Pacific Chemicals LLC and Hercules, Inc.

In separate aspects, the resin can be provided in the form of a solid powder, prill, lump, flake or melt.

Often, the resin having azetidinium functional groups is an adduct of an epoxide with a polyamine resin, a polyamidoamine resin, or a polyamide resin. Such resins typically are made from glycidylether or epichlorohydrin condensates of polyalkylene polyamines, and they may be water-soluble or water-dispersible. Illustrative commercially-available adducts of epoxides with polyamine resins, polyamidoamine resins, or polyamide resins include those sold under the names AMRES® (Georgia-Pacific Chemicals, LLC), as well as KYMENE® and REZOSOL® (Hercules, Inc.). Specific examples of such resins include AMRES-25 HP® (Georgia-Pacific Chemicals LLC), which is formed from the reaction product of epichlorohydrin and a polyamide, as well as KYMENE 557H® (Hercules, Inc.), which is formed from the reaction product of epichlorohydrin and poly(adipic acid-co-diethylenetriamine). An excess of epichlorohydrin is used to control the rate of cross-linking during the manufacturing process and to aid in storage stability. Such compositions and processes for their manufacture are described, for example, in U.S. Pat. Nos. 2,926,116 and 2,926,154, (the disclosures of which are incorporated herein in their entireties by this reference) the disclosed compositions and processes being hereby incorporated by reference. Cationic polyazetidinium resins are known in the art as useful for imparting wet strength to paper and paper products.

Polyazetidinium resins, known as polyamidoamine-halohydrin (or generally polyamide-halohydrin) resins, can be formed as reaction products of a polyamine or a polyamidoamine and a halohydrin (e.g., epichlorohydrin or epibromohydrin). Polyamidoamines, in turn, are prepared from the reaction of a polyamine and a polyacid. Suitable polyamines include, but are not limited to, polyalkylene polyamines such as diethylenetriamine or triethylenetetraamine. Other polyamines, such as those in the JEFFAMINE® family (Huntsman, LLC) may also be employed. Mixtures of polyamines are also applicable. Suitable polyacids include diacids such as succinic acid, adipic acid, oxalic acid, phthalic acid, etc. Depending on the mole ratio of the polyamine and polycarboxylic acid, the resulting polyamidoamine may retain predominantly primary amine groups or predominantly carboxylic acid groups at the terminal polymer ends. These termini may also have secondary or tertiary amine moieties. Details pertaining to the possible reactants that may be used to prepare polyamidoamines and the resulting polyamidoamine-halohydrin azetidinium resins, as well as the reaction conditions and synthesis procedures, are described in U.S. Pat. No. 2,926,154 (which refers specifically to polyamidoamine-epichlorohydrin resins and which disclosure is incorporated herein in its entirety by this reference).

Various modified polyamidoamine-halohydrin resins, which are also characterized as resins having azetidinium functional groups, are known in the art and are suitable for use in cross linking polysaccharides. For example, U.S. Pat. No. 5,585,456 (the disclosure of which is incorporated herein in its entirety by this reference) describes linking the primary amine ends of polyamidoamine oligomers, synthesized as described above, by reaction with a dialdehyde (e.g., glyoxal). The resulting "chain-extended" polyamidoamine polymer is thereafter contacted with a halohydrin to react with the remaining available amine groups and thereby yield an aqueous polyazetidinium resin having hydrolyzable bonds in its polymer structure. Other modified forms of the cationic, water-soluble polyamidoamine-halohydrin resins useful as azetidinium-functional resins of the present invention include those modified forms described in U.S. Pat. Nos. 3,372,086; 3,607,622; 3,734,977; 3,914,155; 4,233,411; and 4,722,964, the disclosures of which are incorporated herein in their entireties by this reference.

Aqueous binder compositions comprising a polysaccharide and a resin having azetidinium functional groups can also contain, in minor amounts on a dry solids basis, (1) additional cross linking agents, such as polyamines, polyamides, diisocyanates, polyols, or mixtures thereof; or (2) heat reactive resin components, such as an aldehyde-based resin, an isocyanate-based resin, or mixtures thereof. Combinations of these additives, such as a combination of (1) and (2) above, can also be employed. A broad range of weight ratios, on a dry solids basis, of azetidinium-functional resin to additive (or combined additives, when used in combination) may be employed. Typically, the additive(s), when used, are present in an amount such that the ratio of azetidinium-functional resin dry solids weight: additive dry solids weight (or combined additive dry solids weight, when additives are used in combination), is from about 10:1 to about 3:2. Typically, this ratio ranges from about 5:1 to about 2:1. For example, a polyacrylamide cross-linking agent may be added to the azetidinium-functional resin in a dry solids weight ratio of azetidinium-functional resin: polyacrylamide of 4:1. Alternatively, both a polyacrylamide cross-linking agent and a phenol-formaldehyde resin may be added to the azetidinium-functional resin in a dry solids weight ratio of azetidinium-functional resin: (polyacrylamide+phenol-formaldehyde) of 3:1.

Various additional cross linking agents and heat reactive resins that may be added to azetidinium-functional resins, as well as their manner of addition, are described in detail in co-pending U.S. Patent Application Publication No. 2007/0054144 A1, the disclosure of which of is incorporated herein by its entirety by this reference.

Both the polysaccharide and the resin having azetidinium functional groups, which are used in the aqueous binder composition, may be combined to yield an aqueous solution or dispersion of these components. Thus, it is possible, for example, to add the polysaccharide (e.g., starch) as a solid to an aqueous solution or dispersion of the azetidinium-functional resin. In this case, the resin will typically have a dry solids content from about 5% to about 80% by weight, often from about 5% to about 75% by weight, or from about 20% to about 65% by weight. The dry solids content is conveniently measured according to art-recognized methods for determining the solids (or non-volatiles) content of resins in general. That is, the dry solids or non-volatiles weight can be measured based on the weight of solids remaining after heating a small (e.g., 1-5 gram), sample of the solution or dispersion is heated at about 105° C. for about 3 hours. The balance of such a solution or dispersion may be water, optionally containing various additives known in the art to improve tack, viscosity, bonding strength, cure rate, moisture resistance, and other characteristics. Such additives are described in co-pending U.S. Patent Application Publication No. 2007/0054144 A1 as well as in U.S. Pat. No. 4,915,766, the disclosure of which is incorporated herein in its entirety by this reference.

It is also possible to add the azetidinium-functional resin in a solid form such as a powder, to an aqueous solution or dispersion of the polysaccharide, optionally containing the same additives as described above with respect to the aqueous solution or dispersion of the azetidinium-functional resin. The dry solids content of an aqueous solution or dispersion of the polysaccharide typically ranges from about 5% to about 50% by weight and or from about 10% to about 35% by weight. Otherwise, solutions or dispersions of both the polysaccharide component and the azetidinium-functional resin component may be combined to prepare aqueous binder compositions as discussed herein. The initial forms of these components (i.e., whether in solution, dispersion, or solid forms) are therefore not critical. Regardless of these initial forms, in the resulting aqueous binder compositions, the dry solids content of the azetidinium-functional resin will typically represent from about 0.1 wt % to about 10 wt %, and or from about 1 wt % to about 6 wt %, of the dry solids content of the polysaccharide. The overall dry solids content of the aqueous binder composition will generally be in the ranges given above with respect to the dry solids content of the azetidinium-functional resin or the polysaccharide, when used in solution or dispersion form.

The aqueous binder compositions comprising a polysaccharide and an azetidinium-functional resin may be applied to or combined with a solid component such as a solid particulate to yield a binder and substrate system that forms a bound matrix, through cross linking of the polysaccharide, when the system is heated and/or dried. Any solid component that can benefit from being bound with a biodegradable polysaccharide having enhanced strength and water resistance is suitable for forming the binder/substrate system. Exemplary solid components include those used in hydroseeding (e.g., seeds, fertilizer particles or pellets, mulch, and other ingredients) in soil erosion control (e.g., wood chips, hay, straw, or other plant fibers), in landfill covering (e.g., refuse, compost, and other solid waste).

Another solid component of particular interest is mill scale, which is a predominantly iron oxide containing byproduct of steel manufacture. If properly agglomerated, mill scale fines may be recycled, in a bound form, back to the blast furnace where they serve as a cooling agent to at least partly counteract the highly exothermic oxidation reactions between oxygen and oxidizable species in the iron. Mill scale agglomerates with somewhat reduced mechanical strength requirements may otherwise be added to molten steel while it undergoes refining. Descriptions of both of these applications are found in U.S. Pat. No. 4,585,475, the disclosure of which is incorporated in its entirety by this reference. The recycle of particulate mill scale for either of these uses, as well as others, can benefit from the biodegradable, cross-linked polysaccharide binders described herein.

Other types of solid components, to which the aqueous binder compositions, described herein, can be effectively applied include dust and other particulates. Of particular concern are small solid particulates that easily become airborne and can thus contribute to respiratory ailments and other health problems when inhaled. Dust generation is a common problem found on transportation thoroughfares, mines, mineral storage piles, tailings storage, and other areas where particulates may be generated and dispersed into the air and onto surrounding surfaces. In fact, regulatory agencies such as the EPA publish guidelines regarding dust emissions associated with these and other activities.

The application of the aqueous binder compositions to surfaces within and surrounding such activities and areas can effectively bind the dust and other solids to prevent their air entrainment, mitigate associated health risks, and/or comply with agency guidelines for air quality. Thus, heating and/or drying of the aqueous binder after this application can form a bound matrix comprising dust or other solids. Again, cross linking of the polysaccharide advantageously improves the water resistance of the binder, such that its integrity is maintained even after exposure to high humidity, rain, and wetting/drying cycles. Moreover, the water-resistant binder, having an improved degree of "permanence" relative to the unbound polysaccharide, is generally less expensive than conventional acrylate polymers and other known agents employed in dust control.

The binder/substrate systems comprising the aqueous binder compositions as described herein generally have a solid component (e.g., a solid particulate) content representing from about 10 wt % to about 99 wt %, typically from about 50% to about 99%, and or from about 85 wt % to about 98 wt %, of the dry solids content of the system. In forming the binder and substrate systems, the aqueous binder composition may be mixed with the solid component (e.g., a solid particulate) or substrate in any manner suitable for obtaining a substantially or completely homogeneous mixture and, if necessary, without damaging the solid component. In some cases, such as in the ground cover applications to control soil erosion, as well as in the dust control applications discussed above, the aqueous binder composition may be sprayed onto the solid component (e.g., hay or straw) and then allowed to dry, thereby forming a bound matrix having a cross linked, biodegradable binder with the improved moisture resistance characteristics as described herein.

Regardless of how the aqueous binder composition is applied to the solid component, a bound matrix is formed from the binder and substrate system by cross linking the polysaccharide with the azetidinium-functional resin. This cross linking or curing is achieved through heating or drying the system, or a combination of both heating and drying. As discussed above, according to some methods for binding the solid component, the binder/substrate system may be subjected to the requisite heating and/or drying simply by being exposed over time to ambient (e.g., outdoor) conditions. Otherwise, external heat may be applied. The use of pressure (e.g., with a heated platen press) together with heating and/or drying may optionally be incorporated into the cross linking procedure to produce a bound matrix that is a pressed article (e.g., in the form of a mat). Additionally, a mold may be used in conjunction with the heating, drying, and/or pressure, for example, if a particular shape and/or size of the bound matrix is desired. In the case of mill scale and other solid components which (in contrast to seeds, for example) are not particularly heat sensitive, the cross linking reaction and consequently the formation of a bound matrix can be accelerated by heating the system to relatively high temperatures for relatively short periods. For example, a bound mill scale briquette can be prepared by heating the binder/substrate system to a temperature ranging from about 302° F. (150° C.) to about 374° F. (190° C.) for a time from about 3 to about 10 minutes.

The aqueous compositions described herein, comprising a polysaccharide and a resin having azetidinium functional groups, may also be cross linked or cured in the absence of a solid component, such that, instead of a bound matrix, a cross linked polysaccharide is obtained, exhibiting lower solubility in aqueous media and greater mechanical strength than the corresponding un-cross linked polysaccharide.

The cross-linked polysaccharides may be provided as an aqueous suspension, dispersion, or solution, which may be adjusted to the desired solids content. Otherwise, a solid form of this material can be prepared by drying or lyophilization, optionally followed by grinding if a smaller particle size material or a powder is desired. The powder form may be preferred in some instances, because of an extended storage life when properly stored. Solid particles of the cross-linked polysaccharide can also be prepared by spray drying, that can often achieve advantageous qualities, especially with respect to uniformity in particle size.

Irrespective of their form, the cross linked polysaccharides may be used in same manner as the native polysaccharide (i.e., not cross linked with the azetidinium-functional resin), for example, as fibers, films, adhesives, thickeners, rheology modifiers, hydrogels, drug delivery agents, emulsifiers, etc. Particular applications are those that benefit from the improved water resistance and strength properties, imparted by the azetidinium-functional resin. For example, the resin thus provides the polysaccharide with an increased level of durability and/or longevity in applications where the cross linked polysaccharide is subjected to conditions causing biodegradation. At the same time as improving water resistance of the polysaccharide, the azetidinium-functional resin also increases its cationic charge, which may be beneficial, for example, in certain separations and other applications involving charge interaction.

Polysaccharide that are cross linked with a resin having azetidinium functional groups exhibit interactions with, and/or have affinity for, a number of solids and/or ionic species, allowing such polysaccharides to be employed effectively in their selective removal from the liquids in which they are suspended and/or dissolved. These cross linked polysaccharides, for example, are particularly useful as froth flotation depressants in the beneficiation of many types of materials including mineral and metal ores, such as in the beneficiation of kaolin clay. The cross linked polysaccharides are also useful for treating aqueous liquid suspensions, including those containing mill scale, sand, clay, coal, and/or other solids, such as used drill cutting fluids. Other aqueous suspensions are those generated as effluents in phosphate and coal production, sewage treatment, paper manufacturing, or bitumen recovery facilities, which can benefit from the removal of solid particulates and also potentially metallic cations (e.g., in the purification of drinking water) using a number of possible separation processes.

When used as depressants in froth flotation separations, cross linked polysaccharides of the present invention, due to their high selectivity, provide good results at economical addition levels. For example, the cross linked polysaccharides may be added in an amount from about 100 to about 1000 grams, and typically from about 400 to about 600 grams, based on the cross linked polysaccharide solution or dispersion weight, per metric ton of material (e.g., clay-containing ore) that is to be purified by froth flotation. In general, the optimal addition amount for a particular separation can be readily ascertained by those of skill in the art in view of the present disclosure. This optimal addition amount depends on number of factors, including the type and amount of impurities.

Polysaccharides cross linked with polyazetidinium resins can be applied in the froth flotation of a wide variety of value materials (e.g., minerals or metals such as phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, or high molecular weight hydrocarbons such as bitumen). Often, the raw material to be purified and recovered contains sand or clay, for which the cross linked polysaccharides described herein are selective.

Although clay is often considered an impurity in conventional metal or mineral ore beneficiation, it may also be present in relatively large quantities, as the main component to be recovered. Some clays, for example kaolin clay, are valuable minerals in a number of applications, such as mineral fillers in the manufacture of paper and rubber. Thus, one froth flotation process in which the cross linked polysaccharide of the present invention is employed involves the separation of clay from a clay-containing ore. The impurities in such ores are generally metals and their oxides, such as iron oxide and titanium dioxide, which are preferentially floated via froth flotation. Other impurities of clay-containing ores include coal. Impurities originally present in most Georgia kaolin, which are preferentially floated in the purification method of the present invention, include iron-bearing titania and various minerals such as mica, ilmenite, or tourmaline, which are generally also iron-containing.

Thus, the clay, which selectively associates with the cross linked polysaccharide of the present invention, is separately recoverable from metals, metal oxides, and coal. In the purification of clay, it is often advantageous to employ, in conjunction with the cross linked polysaccharide as a depressant, an anionic collector such as oleic acid, a flocculant such as polyacrylamide, a clay dispersant such as a fatty acid or a rosin acid, and/or oils to control frothing.

Other representative froth flotation processes of the present invention involve the beneficiation of coal, phosphate or potash, as well as other value metals and minerals discussed above, in which the removal of siliceous gangue materials such as sand and/or clay and other impurities is an important factor in achieving favorable process economics. Potassium ores and other ores, for example, generally comprise a mixture of minerals in addition to sylvite (KCl), which is desirably recovered in the froth concentrate. These include halite (NaCl), clay, and carbonate minerals that are non-soluble in water, such as aluminum silicates, calcite, dolomite, and anhydrite. Other ore impurities include iron oxides, titanium oxides, iron-bearing titania, mica, ilmenite, tourmaline, aluminum silicates, calcite, dolomite, anhydrite, ferromagnesian, feldspar, and debris or various other solid impurities such as igneous rock and soil. In the case of coal beneficiation, non-combustible solid materials such as calcium magnesium carbonate are considered impurities.

One approach, particularly in the refining of clay-containing ores or in the purification of water containing cationic species as discussed herein, involves the further modification of the polysaccharide and/or the polyazetidinium resin cross linker with an anionic functional group, as described in greater detail below.

The polysaccharide that is cross linked with a polyazetidinium resin is also advantageously employed in the separation of bitumen from sand and/or clay that are co-extracted from natural oil sand deposits. Bitumen/sand mixtures that are removed from oil or tar sands within several hundred feet of the earth's surface are generally first mixed with warm or hot water to create an aqueous slurry of the oil sand, having a reduced viscosity that facilitates its transport (e.g., by pipeline) to processing facilities. Steam and/or caustic solution may also be injected to condition the slurry for froth flotation, as well as any number of other purification steps, described below. Aeration of the bitumen-containing slurry, comprising sand or clay, results in the selective flotation of the bitumen, which allows for its recovery as a purified product. This aeration may be effected by merely agitating the slurry to release air bubbles and/or introducing a source of air into the bottom of the separation cell. The optimal amount of air needed to float the desired bitumen, without entraining excessive solid contaminants, is readily determined by one of ordinary skill in the art.

Thus, the use of the cross linked polysaccharide depressant of the present invention advantageously promotes the retention of the sand and/or clay impurities in an aqueous fraction, which is removed from the bottom section of the froth flotation vessel. This bottoms fraction is enriched (i.e., has a higher concentration of) the sand and/or clay impurities, relative to the initial bitumen slurry. The overall purification of bitumen may rely on two or more stages of flotation separation. For example, the middle section of a primary flotation separation vessel may contain a significant amount of bitumen that can ultimately be recovered in a secondary flotation of this "middlings" fraction.

The cross linked polysaccharide can also benefit the froth flotation of value materials described herein to remove metallic contaminants and heavy metals in particular, including mercury, cadmium, lead, and arsenic as well as compounds containing these heavy metals. The treatment of an ore slurry with the cross linked polysaccharide may alternatively be accompanied by, rather than froth flotation, any of the types of separations discussed below (e.g., filtration, cyclone separation, flotation without the use of rising air bubbles, etc.), as well as dissolved air flotation, as discussed below with respect to the removal of mercury from synthetic gypsum. In the case of heavy metal contaminant removal, the purification of coal represents a specific application of increasing environmental significance. Coal typically contains, for example, on the order of from about 0.03 to about 0.3 parts per million (ppm) of total mercury by weight, on a volatile free basis (or non-volatile basis, as described herein). Ever-tightening regulatory standards for airborne mercury emissions have led to requirements for highly effective mercury abatement systems (e.g., activated carbon sorbent materials) on flue gas emissions from coal-fired power plants. The burden on such systems may therefore be reduced through the beneficiation of coal ore that is employed in power generation, in order to reduce the content of total mercury present therein. Currently, about 100 million tons of coal ore are processed using conventional froth flotation.

Mercury may also accumulate in systems designed for reducing sulfur emissions (primarily $SO_2$) from coal-fired power plants. Sulfur removal and recovery, for example, is often accomplished through flue gas desulfurization processes that involve scrubbing (or contacting) the effluent gases from coal combustion with an aqueous alkaline solution that readily dissolves, reacts with, and neutralizes sulfur oxide contaminants. Often, an economically attractive method of sulfur recovery involves the use of aqueous calcium hydroxide (or lime) as the scrubbing medium, which reacts with sulfur oxides to form calcium sulfate, also known as synthetic gypsum. The resulting slurry of precipitated synthetic gypsum may be filtered to reduce its moisture content and further processed in conventional gypsum operations such as in the production of gypsum wallboard.

The presence of mercury in coal can therefore ultimately lead to mercury contamination in synthetic gypsum produced via flue gas desulfurization. In particular, trace amounts of gaseous mercury in flue gas tend to collect in alkaline scrubbing solutions. Moreover, gaseous hydrogen chloride, also normally present in flue gas, converts elemental mercury to $HgCl_2$, which can adhere to the precipitated, solid synthetic gypsum particles.

Treatment of the synthetic gypsum slurry with a depressant comprising a polysaccharide that is cross linked with an azetidinium-functional resin, combined with froth flotation or other separation methods as described herein, allows for a reduction in the level of mercury contamination. It is also possible to form a slurry of synthetic gypsum that has been dehydrated, for example using filtration as described above, and thereafter treat this slurry with the cross linked polysaccharide, in order to effectively reduce the quantity of mercury via froth flotation. Preferably, however, the inefficiencies associated with dehydration and subsequent rehydration can be avoided by treating the slurry prior to filtration of the synthetic gypsum and subjecting this slurry to froth flotation. In any event, representative beneficiation methods of the present invention comprise treating a slurry of ore comprising coal or synthetic gypsum with a depressant comprising the cross linked polysaccharide of the present invention. In the case of synthetic gypsum, this material to be purified is preferably formed, as described above, during desulfurization of flue gas from a coal-burning power plant.

Treatment of synthetic gypsum slurry may be combined with froth flotation either during or subsequent to the treatment. Beneficiation may alternatively involve any of the separation processes discussed herein (e.g., filtration, size or density classification, etc.). A particular separation process of interest in the removal of mercury from synthetic gypsum is known as dissolved air flotation (DAF), which may be facilitated using the cross linked polysaccharide. The use of DAF in the removal of algae and arsenic from water is described, for example, by Wert et al., Proceedings—Water Quality Technology Conference (2003), p. 902-918. Regardless of the nature of the separation, however, the recovery and/or purity of purified synthetic gypsum in a separation process for the removal of mercury may be enhanced using one or more chelating agents, as discussed below, in combination with the cross linked polysaccharide. Chelating agents particularly useful in the separation of mercury from synthetic gypsum will not only form a complex with mercury, but will also contain a functionality that improves the ability of the complexed species to selectively report to a desired stream, such as a froth concentrate (e.g., in a froth flotation where the purified synthetic gypsum product is selectively depressed). Such functionalities include those common in conventional collectors, which aid in flotation, or those that aid in solvation or solubilization of the complexed mercury.

In a representative beneficiation process using froth flotation, treatment of the coal or synthetic gypsum feed slurry with the cross linked polysaccharide may occur before or during the froth flotation. As a result of froth flotation, purified coal or purified synthetic gypsum may be selectively recovered in either the froth concentrate or selectively depressed into the bottoms or tailings stream, depending on the particular operating conditions employed. Likewise, mercury and mercury-containing compounds may be selectively floated or selectively depressed. Froth flotation parameters that determine which components are depressed or floated in a particular separation are well known to those having skill in the art. Normally, in the froth flotation of synthetic gypsum, purified synthetic gypsum is selectively depressed while the relatively smaller amounts of mercury and other contaminants are selected floated. Conversely, the froth flotation of coal is normally performed such that the purified coal is selectively recovered in the froth concentrate while mercury and other impurities are selectively recovered in the bottoms or tailings stream.

In any event, whether mercury contaminants are selectively floated or depressed, their separation from the value mineral may be enhanced through the use of one or more conventional chelating agents in conjunction with the cross linked polysaccharide. A chelating agent may be added to the ore slurry together with the cross linked polysaccharide, or alternatively before or after the cross linked polysaccharide is added. Suitable chelating agents have the capacity to effectively bind or form a metal-ligand complex with mercury. Chelating agents may additionally improve coal beneficiation by removing iron contaminants and iron sulfide (pyrite) in particular. The reduction of both the iron and sulfur content of the purified coal improves both its fuel value (through the reduction of non-combustibles) as well as its acid gas emission characteristics (through the reduction of sulfur).

Chelating agents include, for example, multi-functional carboxylates such as hydroxyethylenediaminetriacetic acid (HEDTA), diethylenetriaminepentaacetic acid (DTPA), ethylenediaminetetraacetic acid (EDTA), diethyltriaminepentaacetic (DTPA), and nitrilotriacetic acid (NTA), which are typically used in their corresponding acetate salt forms (e.g., their sodium salt forms, such as pentasodium DTPA or trisodium NTA). These chelating agents include, for example, those in the Dissolvine® family of products (Akzo-Nobel Functional Chemicals by, Netherlands), such as Dissolvine® H-40, Dissolvine® D-40, Dissolvine® D-40-L, and Dissolvine® A-150-S. Salts of oxalic acid (oxalate salts) may also be employed alone or in combination with these chelating agents. Amino acids are also useful as agents having a carboxylic acid group that can chelate with iron and other metal contaminants. When used in conjunction with the cross linked polysaccharide, the amino acid or other chelating agent as discussed above can react with the polysaccharide and/or azetidinium-functional resin, thereby incorporating a desired chelation functionality into the cross linked polysaccharide. Suitable amino acids include arginine, cysteine, serine, alanine, etc. Likewise, agents such as caprolactam and other cyclic amides can be hydrolyzed to form species having both amino and carboxylic acid functional groups that can similarly add chelation functionality to the cross linked polysaccharide.

Other classes of chelating agents include resins having sulfur atom-bearing functional groups, such as thiosemicarbazide and its derivatives. Thiosemicarbazide may be incorporated into resins such as styrene-divinylbenzene copolymers or ion exchange resins such as the weakly acidic Amberlite IRC-50® (Rohm and Haas Company, Philadelphia, Pa. USA). In the latter case, the resulting polymer contains a multidentate chelate ring containing O, N, and S donor sites. A representative thiosemicarbazide derivative functional group is diacetyl-bis(N-methylthiosemicarbazone).

Other sulfur-containing additives may likewise improve the efficiency (e.g., product purity and/or recovery) of froth flotation in the removal of mercury from coal or synthetic gypsum, and may therefore be employed in combination with the cross linked polysaccharide and optionally further in combination with one or more of the above-described chelating agents. Species having one or more mercapto functional groups, as well as one or more acid functional groups, are effective in this application and these include, for example, 2,3 dimercaptopropanesulfonate sodium (DMPS) and 2,3 meso dimercaptosuccinic acid (DMSA). Other sulfur-containing species such as alpha-lipoic acid, cysteine, and glutathione may also be employed for the formation of mercury complexes, resulting in improved sequestration of mercury in the froth flotation bottoms. Thioacid homologues of the carboxylic acid chelating agents discussed above, as well as their corresponding thioester derivatives, are also suitable for this purpose. Iodine-containing derivatives of any of the chelating agents discussed above may also be effective in the formation of stable complexes with mercury and other metal impurities. The effectiveness associated with any given amount of any of the above chelating agents, sulfur-containing compounds, or other additives for any particular application can be readily ascertained by those having skill in the art, in view of the present disclosure. In the case of a given sulfur containing compound, its effectiveness will depend not only on its affinity for mercury contaminants in coal or synthetic gypsum, but also on the ease of its separation, both in its complexed and un-complexed state, from the purified product.

Other additives that may be used in combination with the cross linked polysaccharide, to potentially improve its performance in coal ore beneficiation by froth flotation, include known reagents, collectors, frothers, promoters, and other agents used in this service, as described, for example, by Laskowski, COAL FLOTATION AND FINE COAL UTILIZATION, Elsevier (2001).

As a result of beneficiation, the final amount of total mercury present in the ore (e.g., comprising coal or synthetic gypsum) is less than the initial amount (i.e., the initial amount of total mercury is reduced), on a volatile free weight basis. In representative embodiments, the final amount of total mercury is less than about 10 parts per billion (ppb), less than about 5 ppb, or even less than 1 ppb. The final amount of total mercury may range, for example, from about 1 to about 100 ppb, from about 1 to about 10 ppb, or from about 5 to about 50 ppb. Any conventional method (e.g., inductively coupled plasma (ICP) or atomic absorption spectrometry (AAS) analysis) may be used in the determination of the total mercury amount, which refers to the amount of mercury present both in elemental form and in the form of mercury-containing compounds.

In the case of coal ore used in power plants, the removal of other impurities, in addition to heavy metals, can significantly improve the fuel value and/or the resulting combustion emissions of the purified coal recovered via froth flotation or other separation processes discussed herein. The reduction of nitrogen- and sulfur-containing compounds, for example, is important in many cases for compliance with nitrogen oxide and sulfur oxide emission tolerances designed to reduce the prevalence of these acid rain precursors in the environment. Froth flotation of an impure coal ore is conventionally employed for upgrading coal-fired power plant feedstocks in this manner. The removal of unwanted contaminants with froth flotation may be facilitated by treating an aqueous slurry of the impure coal ore with a cross linked polysaccharide of the present invention, either before or during the froth flotation. Conventional froth flotation in coal ore beneficiation is generally described, for example, at http://www.cq-inc.com/Coal_Primer.pdf, the disclosure of the coal beneficiation process being hereby incorporated by reference. Purified coal recovered in the froth concentrate may have a reduced amount, relative to the impure coal, of an impurity such as nitrogen, sulfur, silicon, ash, or pyrite. The reduction in these impurities is determined on a volatile free basis, as described herein (e.g., on a volatile free weight basis).

The amount of nitrogen impurity refers to the total amount of nitrogen present in nitrogen-containing compounds in a coal sample, expressed in terms of a weight fraction (or weight-%, weight-ppm, etc.) of the element relative to the total volatile free sample weight. Other conventional measures and analyses may also be used to compare the relative amounts of nitrogen in the impure and purified coal samples, such as measurements of the total organic nitrogen, total basic nitrogen, etc. Sulfur and silicon impurities refer to the total amounts of sulfur and silicon present either in elemental form or in compounds containing these elements, also generally expressed as a weight fraction on a volatile free weight basis. Silicon generally represents a significant portion of the non-combustible ash component of coal. As such, beneficiation for the reduction in the amount of measured ash may similarly be facilitated according to methods described herein. Pyrite (or iron sulfide) is also normally measured on a volatile free weight basis, for comparison of the amount of this impurity in the purified coal relative to that in the impure coal ore. A reduction in pyrite content of coal reduces the amount of sulfur impurity and also improves the fuel value (e.g., measured in BTU/lb).

Other benefits associated with the use of the cross linked polysaccharide in the froth flotation of coal may therefore include an increased BTU value per unit weight, or alternatively (or in combination) a reduced amount of moisture. In any event, the reduced amount(s) of one or more (e.g., two or more, or all) of the impurities described above, in the purified coal recovered in the beneficiation, using froth flotation, of impure coal ore, is/are preferably less than the corresponding reference amount(s) in a purified reference coal recovered in the same froth flotation operation, but without using the cross linked polysaccharide. Preferred moisture levels of coal that is purified according to any of the methods described herein are less than about 12% by weight, in the range from about 5% to about 12% by weight, or in the range from about 5% to about 10% by weight. Preferred fuel values are greater than about 12,000 BTU/lb, and in the range from about 12,000 to about 13,000 BTU/lb.

Generally, in any froth flotation process according to the present invention, at least about 70% of the value material (e.g., kaolin clay, phosphate, or bitumen) is recovered from the raw material (e.g., the clay-containing ore), with a purity of at least about 85% by weight. Also, conventional known collectors may be used in conjunction with cross linked polysaccharides, when used as depressants. These collectors include, for example, fatty acids (e.g., oleic acid, sodium oleate, hydrocarbon oils), amines (e.g., dodecylamine, octadecylamine, α-aminoarylphosphonic acid, and sodium sarcosinate), and xanthanate. Likewise, conventional depressants known in the art for a given separation can also be combined with the cross linked polysaccharide depressants. Conventional frothing agents that aid collection, (e.g., methylisobutylcarbinol, pine oil, and polypropylene oxides) may also be used, in accordance with normal flotation practice, in conjunction with the cross linked polysaccharide depressants of the present invention.

In froth flotation separations, the pH of the slurry to which the cross linked polysaccharides of the present invention, when used as depressants, are added will vary according to the particular material to be processed, as is appreciated by those skilled in the art. Commonly, the pH values range from neutral (pH 7) to strongly alkaline (e.g., pH 12). It is recognized that in some flotation systems, for example in copper sulfide flotations, high pH values (e.g., from about 8 to about 12.5) give best results.

Typically in froth flotation for the beneficiation of solid materials such as mineral or metal ores, the raw materials are usually first ground to the "liberation mesh" size where most of the value material-containing particles are either separate mineral or metal particles or salt crystals, and the gangue (e.g., clay and/or sand) is mixed between these particles. The solid material may be ground to produce, for example, one-eighth inch average diameter particles prior to incorporation of the material into a brine solution to yield an aqueous slurry. After crushing and slurrying the material, the slurry may be agitated or stirred in a "scrubbing" process that breaks down clay or ash into very fine particles that remain in the brine as a muddy suspension. Some of this clay or ash may be washed off the ore particles, into a clay-containing aqueous suspension or brine, prior to froth flotation. Also, as is known in the art, any conventional size classification operations, some of which are discussed in greater detail below, may be employed to further reduce/classify raw material particle size, remove clay- or ash-containing brine, and/or recover smaller solid particles from the muddy brine, prior to froth flotation. Such size classification operations include further crushing/screening, cycloning, and/or hydro separation, any of which may be performed with or without the use of a cross linked polysaccharide.

Ore beneficiation according to the present invention comprises treating an aqueous slurry of the ore with a depressant comprising a cross linked polysaccharide, as described herein. The treatment of the ore slurry with the depressant typically involves combining the depressant and slurry (e.g., by adding the depressant to the slurry), normally in a manner such that the depressant is readily dispersed throughout. The treatment may occur before or during froth flotation, or before or during any of the other separation processes described herein (e.g., filtration, cyclone separation, dissolved air flotation, etc.). In the case of treatment before froth flotation, the treatment may also comprise conditioning the ore in the presence of the depressant, prior to froth flotation. Conditioning may be beneficial in allowing the depressant and ore slurry to thoroughly mix for a given time period, typically from about 30 seconds to about 10 minutes, prior to subjecting the mixture to aeration or froth flotation. During the conditioning time, the depressant can become associated, for example, with unwanted gangue material, thereby improving the performance of the subsequent froth flotation. Conditioning of a depressant/slurry mixture in the absence of aeration or froth flotation can occur in a separate conditioning vessel such as a mixer or mechanical flotation cell, pipe, barrel, etc. prior to transfer of the mixture to a froth flotation cell. Alternatively, conditioning can occur in the same vessel used for froth flotation. The same or different conditions in terms of temperature, pH, agitation, etc., may be used for conditioning and froth flotation. Typical conditions that may be employed in a conditioning step include a temperature from about 1° C. to about 95° C. and a pH of at least about 2.0, and often a pH from about 3.0 to about 7.0. Also, the same agents, as conventionally used and/or discussed herein, may be incorporated into the ore slurry in a conditioning step, in addition to the depressant. Such agents include collectors, activators, frothing agents, pH modifiers, etc.

In froth flotation, the slurry, typically having a solids content from about 5% to about 50% by weight, is transferred to one or more froth flotation cells. Air is forced through the bottoms of these cells and a relatively hydrophobic fraction of the material, having a selective affinity for the rising bubbles, floats to the surface (i.e., the froth), where it is skimmed off and recovered in the froth concentrate. A bottoms product that is hydrophilic relative to the froth concentrate may also be recovered. The process may be accompanied by agitation. Commercially salable products can be prepared from the separate fractions recovered in this manner, often after further conventional steps, including further separation (e.g., by centrifuge), drying (e.g., in a gas fired kiln), size classification (e.g., screening), and refining (e.g., crystallization), are employed.

The froth flotation of the present invention may, though not always, involve flotation in "rougher cells" followed by one or more "cleanings" of the rougher concentrate. Two or more flotation steps may also be employed to first recover a bulk value material comprising more than one component, followed by a selective flotation to separate these components. Cross linked polysaccharides of the present invention, when used as depressants, can be used to advantage in any of these steps to improve the selective recovery of desired materials via froth flotation. When multiple stages of froth flotation are used, the cross linked polysaccharides may be added using a single addition prior to multiple flotations or they may be added separately at each flotation stage.

Because of their affinity for solid contaminants in liquid suspensions, the cross linked polysaccharides of the present invention are applicable in a wide variety of separations, and especially those involving the removal of siliceous contaminants such as sand, clay, and/or ash from aqueous liquid suspensions or slurries of these contaminants. Such aqueous suspensions or slurries may therefore be treated with polysaccharides that are cross linked with an azetidinium-functional resin, allowing for the effective separation of at least a portion of the contaminants, in a contaminant-rich fraction, from a purified liquid. A "contaminant-rich" fraction refers to a part of the liquid suspension or slurry that is enriched in solid contaminants (i.e., contains a higher percentage of solid contaminants than originally present in the liquid suspension or slurry). Conversely, the purified liquid has a lower percentage of solid contaminants than originally present in the liquid suspension or slurry.

The separation processes described herein are applicable to "suspensions" as well as to "slurries" of solid particles. These terms are sometimes defined equivalently and sometimes are distinguished based on the need for the input of at least some agitation or energy to maintain homogeneity in the case of a "slurry." Because the methods of the present invention, described herein, are applicable broadly to the separation of solid particles from aqueous media, the term "suspension" is interchangeable with "slurry" (and vice versa) in the present specification and appended claims.

One exemplary use of the cross linked polysaccharides described herein is in flocculation, which refers to the bridging or agglomeration of solid particles together into clumps or flocs. This ultimately facilitates their separation by, for example, settling or flotation, depending on the density of the flocs relative to the liquid. Otherwise, filtration may be employed as a means to separate larger flocs.

Flocculation is generally employed in the purification of aqueous liquid suspensions comprising a particulate solid (such as a solid contaminant), a vast number of that are encountered in mineral, chemical, and municipal processes; sewage processing; paper production processes; and a wide variety of other water-consuming industries. Examples of aqueous liquid suspensions include oil or gas well drilling fluids, which accumulate solid particles of rock or drill cuttings in the normal course of their use. These drilling fluids, often referred to as "drilling muds," are important in the drilling process for several reasons, including transporting these drill cuttings from the drilling area to the surface, where their removal allows the drilling mud to be recirculated. The addition of a flocculating agent to oil well drilling fluids, and especially water-based (i.e., aqueous) drilling fluids, effectively coagulates or flocculates solid particles (e.g., contaminants) into larger agglomerates, thereby facilitating their separation by settling or flotation.

Additional uses for flocculants in solid/liquid separations include the agglomeration of clays that are suspended in the large waste slurry effluents from phosphate production facilities. The removal of suspended solid particulates is often an important consideration in the purification of water, such as in the preparation of drinking (i.e., potable) water. Aqueous effluents from steel mills, which contain solid mill scale particles, represent another type of suspension that may be purified via flocculation.

In these aqueous liquid suspensions (used drilling fluids, clay-containing slurries, impure drinking water, and steel mill effluents), as well as many others, polysaccharides, including hydrocolloidal polysaccharides such as alginates (copolymers of D-mannuronic and L-guluronic acids) and guar gum may be cross linked with an azetidinium resin as described herein and used as flocculating agents. The purification of such suspensions may therefore involve adding a sufficient amount of these flocculating agents to electronically interact with and either coagulate or flocculate the particulate solids (e.g., contaminants) into larger agglomerates. The necessary amount can be readily determined depending on a number of variables (e.g., the type and concentration of particulates), as would be readily appreciated by those having skill in the art, having regard for the present disclosure.

During or after the addition of the flocculating agent, the coagulated or flocculated solid contaminant (i.e., in the form of larger, agglomerated particles or flocs) is recovered or removed. Recovery or removal may be effected by any conventional method, including sedimentation or flotation, which may be performed optionally with the use of rising bubbles of air or other gas. The optimal approach for removal will depend on the relative density of the flocs and other factors known to those having skill in such separations. Increasing the quantity of cross linked polysaccharide flocculating agent that is used to treat the suspension can in some cases increase the tendency of the flocs to float rather than settle. Filtration or straining may also be an effective means of removing the agglomerated flocs of solid particulates, regardless of whether they reside predominantly in a surface layer or in a sediment. Independent of the removal step employed, a particulate-rich fraction is ultimately separated from a purified liquid, wherein the former is more concentrated, and the latter less concentrated, in the solid particulate, relative to the aqueous liquid suspension prior to the purification. Generally, at least about 85 wt %, typically at least about 90 wt %, and often at least about 95 wt %, of the solid particulate may be removed in the particulate-rich fraction.

When employed in any of the applications discussed above, the polysaccharides, in addition to being cross linked with a resin having azetidinium functional groups, may also be further modified with a coupling agent. The particular site at which the coupling agent modifies, binds to, or derivatizes the cross linked polysaccharide may be on either the polysaccharide or the azetidinium-functional resin. In any event, a suitable coupling agent, for modifying a cross linked polysaccharide, is highly selective for binding to solid contaminants and especially siliceous materials such as sand or clay.

Modified cross linked polysaccharides are prepared by modifying the polysaccharide and/or azetidinium-functional resin, as described above, with a coupling agent that is highly selective for binding with unwanted solid materials (e.g., sand or clay) and/or ionic species such as metallic cations to be separated in the separation/purification processes of the present invention. Without being bound by theory, the coupling agent is believed to improve the ability of the cross linked polysaccharide, which, in one embodiment, is generally cationic (i.e., carries more overall positive than negative charge) to attract most clay surfaces, which are generally anionic (i.e., carry more overall negative than positive charge). These differences in electronic characteristics between the cross linked polysaccharide and clay can result in mutual attraction at multiple sites and even the potential sharing of electrons to form covalent bonds. The positive-negative charge interactions that cause clay particles to become attracted to the cross linked polysaccharide is potentially explained by several theories, such as host-guest theory (including podands), hard-soft acid base theory, dipole-dipole interactions, and Highest Occupied Molecular Orbital-Lowest unoccupied Molecular Orbital (HOMO-LUMO) interactions, hydrogen bonding, Gibbs free energy of bonding, etc.

The coupling agent may be added before, during, or after the cross linking reaction between the polysaccharide and the resin having azetidinium functional groups. For example, the coupling agent may be added to a mixture of the polysaccharide and azetidinium-functional resin prior to cross linking. Alternatively, the coupling agent may be added to a solution or dispersion of the cross linked polysaccharide product. Also, any temperatures or other conditions associated with the cross linking of the polysaccharide with an azetidinium-functional resin are suitable for incorporation of the coupling agent, in order to provide a cross linked polysaccharide, modified with a coupling agent. In some cases, a silane coupling agent may be added to the liquid that is to be purified (e.g., the froth flotation slurry) and that contains the cross linked polysaccharide, in order to modify it in situ.

Representative coupling agents that can modify the cross linked polysaccharide of the present invention and that also have the desired binding selectivity or affinity for impurities such as sand, clay, and/or ionic species include substituted silanes, which posses both an organofunctional group, capable of reacting with the cross linked polysaccharide, and a second group (e.g., a trimethoxysilane group), capable of adhering to, or interacting with, unwanted impurities (especially siliceous materials). Without being bound by theory, the second group may effect the agglomeration of these impurities into larger particles or flocs (i.e., by flocculation), upon treatment with the cross linked polysaccharide. This facilitates their removal. In the case of ore froth flotation separations, this second group of the coupling agent promotes the sequestering of either gangue impurities or desired materials (e.g., kaolin clay) in the aqueous phase, in which the for which the cross linked polysaccharide has a high affinity. This improves the separation of value materials from the aqueous phase by flotation with a gas such as air.

Representative organofunctional groups of the silane coupling agents include, but are not limited to, ureido-containing moieties (e.g., ureidoalkyl groups), amino-containing moieties (e.g., aminoalkyl groups), sulfur-containing moieties (e.g., mercaptoalkyl groups), epoxy-containing moieties (e.g., glycidoxyalkyl groups), methacryl-containing moieties (e.g., methacryloxyalkyl groups), vinyl-containing moieties (e.g., vinylbenzylamino groups), alkyl-containing moieties (e.g., methyl groups), or haloalkyl-containing moieties (e.g., chloroalkyl groups). Representative substituted silane coupling agents of the present invention therefore include ureido substituted silanes, amino substituted silanes, sulfur substituted silanes, epoxy substituted silanes, methacryl substituted silanes, vinyl substituted silanes, alkyl substituted silanes, and haloalkyl substituted silanes.

It is also possible for the silane coupling agent to be substituted with more than one organofunctional group. For example, the tetravalent silicon atom of the silane coupling agent may be independently substituted with two or three of the organofunctional groups described above. As an alternative to, or in addition to, substitution with multiple base-resin reactive groups, the silane coupling agent may also have multiple silane functionalities, to improve the strength or capacity of the coupling agent in bonding with either gangue impurities such as sand or desired materials such as kaolin clay. The degree of silylation of the silane coupling agent can be increased, for example, by incorporating additional silane groups into coupling agent or by cross linking the coupling agent with additional silane-containing moieties. The use of multiple silane functionalities may even result in a different orientation between the coupling agent and clay surface (e.g., affinity between the clay surface and multiple silane groups at the "side" of the coupling agent, versus affinity between a single silane group at the "head" of the coupling agent).

The silane coupling agents also comprise a second group, as described above, that includes the silane portion of the molecule, that is typically substituted with one or more groups selected from alkoxy (e.g., trimethoxy), acyloxy (e.g., acetoxy), alkoxyalkoxy (e.g., methoxyethoxy), aryloxy (e.g., phenoxy), aroyloxy (e.g., benzoyloxy), heteroaryloxy (e.g., furfuroxy), haloaryloxy (e.g., chlorophenoxy), heterocycloalkyloxy (e.g., tetrahydrofurfuroxy), and the like. Representative silane coupling agents, having both organofunctional groups and second groups (e.g., gangue-reactive groups) as described above, for use in modifying the base resin, therefore include ureidopropyltrimethoxysilane, ureidopropyltriethoxysilane, aminopropyltrimethoxysilane, aminopropyltriethoxysilane, aminopropylmethyldiethoxysilane, aminopropylmethyldimethoxysilane, aminoethylaminopropyltrimethoxysilane, aminoethylaminopropyltriethoxysilane, aminoethylaminopropylmethyldimethoxysilane, diethylenetriaminopropyltrimethoxysilane, diethylenetriaminopropyltriethoxysilane, diethylenetriaminopropylmethyldimethoxysilane, diethylenetriaminopropylmethyldiethoxysilane, cyclohexylaminopropyltrimethoxysilane, hexanediaminomethyltriethoxysilane, anilinomethyltrimethoxysilane, anilinomethyltriethoxysilane, diethylaminomethyltriethoxysilane, (diethylaminomethyl)methyldiethoxysilane, methylaminopropyltrimethoxysilane, bis(triethoxysilylpropyl)tetrasulfide, bis(triethoxysilylpropyl)disulfide, mercaptopropyltrimethoxysilane, mercaptopropyltriethoxysilane, mercaptopropylmethyldimethoxysilane, 3-thiocyanatopropyltriethoxysilane, isocyanatopropyl triethylsilane, glycidoxypropyltrimethoxysilane, glycidoxypropyltriethoxysilane, glycidoxypropylmethyldiethoxysilane, glycidoxypropylmethyldimethoxysilane, methacryloxypropyltrimethoxysilane, methacryloxypropyltriethoxysilane, methacryloxypropylmethyldimethoxysilane, chloropropyltrimethoxysilane, chloropropyltriethoxysilane, chloromethyltriethoxysilane, chloromethyltrimethoxysilane, dichloromethyltriethoxysilane, vinyltrimethoxysilane, vinyltriethoxysilane, vinyltris(2-methoxyethoxy)silane, vinyltriacetoxysilane, alkylmethyltrimethoxysilane, vinylbenzylaminotrimethoxysilane, (3,4-epoxycyclohexyl)ethyltrimethoxysilane, aminopropyltriphenoxysilane, aminopropyltribenzoyloxysilane, aminopropyltrifurfuroxysilane, aminopropyltri(o-chlorophenoxy)silane, aminopropyltri(p-chlorophenoxy)silane, aminopropyltri(tetrahydrofurfuroxy) silane, ureidosilane, mercaptoethyltriethoxysilane, and vinyltrichlorosilane, methacryloxypropyltri(2-methoxyethoxy)silane.

Other representative silane coupling agents include oligomeric aminoalkylsilanes having, as an organofunctional group, two or more repeating aminoalkyl or alkylamino groups bonded in succession. An example of an oligomeric aminoalkylsilane is the solution Silane A1106, available under the trade name Silquest (GE Silicones-OSi Specialties, Wilton, Conn., USA), which is believed to have the general formula $(NH_2CH_2CH_2CH_2SiO_{1.5})_n$, wherein n is from 1 to about 3. Modified aminosilanes such as a triaminosilane solution (e.g., Silane A1128, available under the same trade name and from the same supplier) may also be employed.

Other representative silane coupling agents are the ureido substituted and amino substituted silanes as described above. Specific examples of these are ureidopropyltrimethoxysilane, ureidopropyltriethoxysilane, aminopropyltrimethoxysilane, and aminopropyltriethoxysilane.

Polysiloxanes and polysiloxane derivatives may also be used as coupling agents, as described above, to enhance the performance of the cross linked polysaccharide in solid/liquid separations. Polysiloxane derivatives include those polyorganosiloxanes obtained from the blending of organic resins with polysiloxane resins to incorporate various functionalities therein, including urethane, acrylate, epoxy, vinyl, and alkyl functionalities.

Silica and/or silicates may be used in conjunction (e.g., added as a blending component) with the cross linked polysaccharide of the present invention to potentially improve its affinity for either gangue impurities or desired materials (e.g., kaolin clay), especially siliceous materials including sand and clay. Other agents that may be used to improve the performance of cross linked polysaccharides in the separation processes of the present invention include polysaccharides (i.e., that are not cross linked), polyvinyl alcohol, polyacrylamide, as well as known flocculants. These agents can be used with the coupling agent-modified cross linked polysaccharides, which are further modified with anionic functional groups (e.g., sulfonate) or stabilized by reaction with an alcohol (e.g., methanol), as described below.

Silica in the form of an aqueous silica sol, for example, is available from Akzo Nobel under the Registered Trademark "Bindzil" or from DuPont under the Registered Trademark "Ludox". Other grades of sol are available having various particle sizes of colloidal silica and containing various stabilizers. The sol can be stabilized by alkali, for example sodium, potassium, or lithium hydroxide or quaternary ammonium hydroxide, or by a water-soluble organic amine such as alkanolamine.

Silicates, such as alkali and alkaline earth metal silicates (e.g., lithium silicate, sodium-lithium silicate, potassium silicate, magnesium silicate, and calcium silicate), as well as ammonium silicate or a quaternary ammonium silicate, may also be used in the preparation of a cross linked polysaccharide. Additionally, stabilized colloidal silica-silicate blends or mixtures, as described in U.S. Pat. No. 4,902,442, the disclosure of which is incorporated in its entirety by this reference.

For the separation processes described herein, the cross linked polysaccharide may be modified using an amount of coupling agent representing from about 0.01% to about 5% of the weight of a solution or dispersion of the polysaccharide (either before or after cross linking with an azetidinium-functional resin) having a solids content from about 30% to about 90%, typically from about 45% to about 70%. In general, lower amounts of coupling agent addition do not achieve appreciable modification of the cross linked polysaccharide, while higher amounts do not improve performance enough to justify the cost of the added coupling agent. When a mixture of coupling agents is used, the total weight of the mixture is normally within this range. An especially desired amount of added coupling agent is from about 0.1% to about 2.5% of the weight of a cross linked polysaccharide solution or dispersion having a solids content within the range given above.

Alternatively, regardless of the solids content of the cross linked polysaccharide solution or dispersion, the coupling agent is generally employed in an amount from about 0.01% to about 17%, and typically from about 0.1% to about 8.3%, of the weight of the cross linked polysaccharide solids. These representative ranges of added coupling agent, based on the weight of the cross linked polysaccharide itself, apply not only to solutions or dispersions, but also to "neat" forms of the cross linked polysaccharide having little or no added solvent or dispersing agent (e.g., water). If the coupling agent is added prior to the cross linking reaction, these ranges also generally apply, using as the basis the combined weight of the polysaccharide and polyazetidinium resin, as described previously, that are reacted. The optimal amount of coupling agent is dependent on a number of factors, including the cross linked polysaccharide solids content, the type of polysaccharide and the particular coupling agent, the purity of the raw ore slurry to be beneficiated or liquid suspension to be purified, etc.

In a further embodiment, the present invention can be described as

1. An aqueous binder composition comprising:
    (a) a polysaccharide and
    (b) a resin having azetidinium functional groups,
    wherein, in said composition, the resin dry solids content is from about 0.1 wt-% to about 10 wt-% of the polysaccharide dry solids content.
2. The composition of any of the preceding paragraphs wherein the polysaccharide is selected from the group consisting of starch, guar gum, and alginate,
3. The composition of any of the preceding paragraphs, wherein said resin dry solids content is from about 1 wt-% to about 6 wt-% of said polysaccharide dry solids content.
4. The composition of any of the preceding paragraphs, wherein said polysaccharide is starch or guar gum.
5. The composition of any of the preceding paragraphs, wherein said resin is the reaction product of a polyamidoamine and a halohydrin.
6. The composition of any of the preceding paragraphs, wherein said halohydrin is epichlorohydrin.
7. The composition of any of the preceding paragraphs, wherein said polyamidoamine is the reaction product of a polyamine and a polycarboxylic acid.
8. A binder and substrate system comprising:
    (a) the aqueous binder composition of any of the preceding paragraphs and
    (b) a solid component.
9. The binder and substrate system of any of the preceding paragraphs, wherein, in said system, the solid component represents from about 85 wt-% to about 98 wt-% of the dry solids content of said system.
10. The binder and substrate system of any of the preceding paragraphs, wherein said solid component is a seed, mill scale, or dust particles.
11. A bound matrix that is formed from heating or drying the aqueous binder composition of any of the preceding paragraphs and a solid component to crosslink said polysaccharide with said resin.
12. A method for binding solid particulates, the method comprising:
    (a) applying the aqueous binder composition of any of the preceding paragraphs to the solid particulates, and
    (b) heating or drying said binder to crosslink said polysaccharide with said resin and form a bound matrix of said solid particulates.
13. The method of any of the preceding paragraphs, wherein step (b) comprises heating said binder to crosslink said polysaccharide with said resin.
14. The method of any of the preceding paragraphs, wherein step (b) comprises heating said binder to a temperature from about 170° C. to about 190° C. for a time from about 3 to about 10 minutes.
15. A method for purifying an aqueous liquid suspension comprising a particulate solid, the method comprising:
    (a) adding a flocculating agent to said the liquid suspension and
    (b) removing (1) at least a portion of said particulate solid in a particulate-rich fraction or (2) a purified liquid,
    wherein said flocculating agent comprises a polysaccharide that is cross linked with a resin having azetidinium functional groups.
16. The method of any of the preceding paragraphs, wherein said flocculating agent is obtained by cross linking said polysaccharide with said resin in an aqueous composition having a resin dry solids content that is from about 0.1 wt-% to about 10 wt-% of the polysaccharide dry solids content.
17. The method of any of the preceding paragraphs, wherein said particulate solid comprises mill scale.
18. The method of any of the preceding paragraphs, wherein said polysaccharide is an alginate.
19. The method of any of the preceding paragraphs, wherein, in step (b), at least 85 wt-% of said particulate solid is removed in said particulate-rich fraction.
20. A binder for mill scale or hydroseeding, said binder comprising a polysaccharide selected from the group consisting of starch, guar gum, alginate, and derivatives thereof,
    wherein said polysaccharide is cross linked with a resin having azetidinium functional groups, wherein said resin is the reaction product of a polyamidoamine and a halohydrin, and
    wherein said binder is obtained from cross linking said polysaccharide and said resin in an aqueous composition having a resin dry solids content that is from about 1 wt-% to about 6 wt-% of a polysaccharide dry solids content.

21. The binder of any of the preceding paragraphs, wherein said halohydrin is epichlorohydrin.
22. A composition comprising a polysaccharide cross linked with a resin having azetidinium functional groups.
23. The composition of any of the preceding paragraphs wherein the polysaccharide is selected from the group consisting of starch, guar gum, alginate, and derivatives thereof.
24. The composition of any of the preceding paragraphs wherein said resin is the reaction product of a polyamidoamine and a halohydrin.
25. The composition of any of the preceding paragraphs wherein said resin comprises from about 1 wt-% to about 6 wt-% of the polysaccharide, on a dry solids basis.
26. The composition of any of the preceding paragraphs, wherein said composition is in the form of solid powder, prill, lump, flake, or melt.
27. A method for beneficiation of an ore, the method comprising treating a slurry of said ore with a depressant comprising a polysaccharide that is cross linked with a resin having azetidinium functional groups.
28. The method of any of the preceding paragraphs, wherein said ore comprises an impurity selected from the group consisting of sand, clay, an iron oxide, a titanium oxide, iron-bearing titania, mica, ilmenite, tourmaline, an aluminum silicate, calcite, dolomite, anhydrite, ferromagnesian, feldspar, calcium magnesium carbonate, igneous rock, soil, and mixtures thereof.
29. The method of any of the preceding paragraphs, wherein said depressant is modified with a coupling agent.
30. The method of any of the preceding paragraphs, wherein said coupling agent is selected from the group consisting of a substituted silane, silica, a silicate, a polysiloxane, and mixtures thereof.
31. The method of any of the preceding paragraphs, wherein said coupling agent comprises a substituted silane selected from the group consisting of a ureido substituted silane, an amino substituted silane, a sulfur substituted silane, an epoxy substituted silane, a methacryl substituted silane, a vinyl substituted silane, an alkyl substituted silane, a haloalkyl substituted silane, and mixtures thereof.
32. The method of any of the preceding paragraphs, wherein said substituted silane comprises a ureido substituted silane or an amino substituted silane.
33. The method of any of the preceding paragraphs, wherein said substituted silane is selected from the group consisting of ureidopropyltrimethoxysilane, ureidopropyltriethoxysilane, aminopropyltrimethoxysilane, aminopropyltriethoxysilane, and an oligomeric aminoalkylsilane.
34. The method of any of the preceding paragraphs wherein, in said depressant, said resin comprises from about 0.1 wt-% to about 10 wt-% of said polysaccharide, on a dry solids basis.
35. The method of any of the preceding paragraphs, wherein said slurry is treated with said depressant in an amount from about 100 to about 1000 grams of said depressant per metric ton of said ore.
36. The method of any of the preceding paragraphs, wherein said beneficiation purifies and recovers, from said ore, a value mineral or metal selected from the group consisting of phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate.
37. The method of any of the preceding paragraphs, wherein said value mineral comprises phosphate or potash.
38. The method of any of the preceding paragraphs, wherein said beneficiation recovers at least 70% by weight of said value mineral or metal from said ore with a purity of at least 85% by weight.
39. The method of any of the preceding paragraphs, wherein said ore comprises coal or synthetic gypsum having an initial amount of total mercury, said treating step is prior to or during a froth flotation step, and said beneficiation purifies and recovers, from said ore, purified coal or purified synthetic gypsum having a final amount of total mercury that is less than said initial amount of total mercury, wherein said initial and final amounts of total mercury are measured on a volatile free weight basis.
40. The method of any of the preceding paragraphs, wherein said final amount of total mercury is less than about 10 ppb by weight on a volatile free basis.
41. The method of any of the preceding paragraphs, wherein said synthetic gypsum is formed during desulfurization of flue gas from a coal-burning power plant.
42. The method of any of the preceding paragraphs, wherein said depressant comprises said polysaccharide that is cross linked with a resin having azetidinium functional groups and a chelating agent.
43. The method of any of the preceding paragraphs, wherein said ore comprises an impure coal ore, said treating step is prior to or during a froth flotation step, and said beneficiation purifies and recovers, from said impure coal ore, purified coal having, relative to said impure coal ore, a reduced amount of an impurity selected from the group consisting of nitrogen, sulfur, silicon, ash, and pyrite, wherein said impurity is measured on a volatile free weight basis.
44. The method of any of the preceding paragraphs, wherein said ore comprises an impure coal ore, said treating step is prior to or during a froth flotation step, and said beneficiation purifies and recovers, from said impure coal ore, purified coal having, relative to said impure coal ore, a reduced amount of moisture or an increased BTU value.
45. The method of any of the preceding paragraphs, wherein said treating comprises combining said slurry of said ore and said depressant, and is followed by froth flotation of said slurry of said ore and said depressant.
46. The method of any of the preceding paragraphs, wherein treating further comprises, after said combining and prior to said froth flotation, conditioning said slurry.
47. The method of any of the preceding paragraphs, wherein said conditioning is carried out in a conditioning vessel for a conditioning time from about 30 seconds to about 10 minutes, at a conditioning temperature from about 1° C. to about 95° C., and at a conditioning pH of at least about 2.0.
48. A method for purifying clay from a clay-containing ore comprising one or more impurities selected from the group consisting of metals, metal oxides, and minerals, the method comprising:
   (a) treating a slurry of clay-containing ore with a depressant comprising a polysaccharide that is cross linked with a resin having azetidinium functional groups, and
   (b) recovering, by froth flotation of said impurity either after or during said treating step (a), a purified clay having a reduced amount of at least one of said impurities.
49. The method of any of the preceding paragraphs, wherein said impurities comprise a mixture of iron oxide and titanium dioxide.
50. The method of any of the preceding paragraphs, wherein said impurities comprise coal.
51. The method of any of the preceding paragraphs, wherein said clay-containing ore comprises kaolin clay.

52. The method of any of the preceding paragraphs, wherein said depressant is modified with a coupling agent.
53. The method of any of the preceding paragraphs, wherein said coupling agent is selected from the group consisting of a substituted silane, silica, a silicate, a polysiloxane, and mixtures thereof.
54. The method of any of the preceding paragraphs, wherein said coupling agent comprises a substituted silane selected from the group consisting of a ureido substituted silane, an amino substituted silane, a sulfur substituted silane, an epoxy substituted silane, a methacryl substituted silane, a vinyl substituted silane, an alkyl substituted silane, a haloalkyl substituted silane, and mixtures thereof
55. The method of any of the preceding paragraphs, wherein said substituted silane comprises a ureido substituted silane or an amino substituted silane.
56. The method of any of the preceding paragraphs, wherein said substituted silane is selected from the group consisting of ureidopropyltrimethoxysilane, ureidopropyltriethoxysilane, aminopropyltrimethoxysilane, aminopropyltriethoxysilane, and an oligomeric aminoalkylsilane.
57. The method of any of the preceding paragraphs wherein, in said depressant, said resin comprises from about 0.1 wt-% to about 10 wt-% of said polysaccharide, on a dry solids basis.
58. A method for purifying bitumen from a bitumen-containing slurry comprising sand or clay, the method comprising:
   (a) treating the slurry with a depressant comprising a polysaccharide that is cross linked with a resin having azetidinium functional groups, and
   (b) recovering, by froth flotation either after or during said treating step (a), purified bitumen having a reduced amount of sand or clay.
59. The method of any of the preceding paragraphs, wherein said depressant is modified with a coupling agent.
60. The method of any of the preceding paragraphs, wherein said coupling agent is selected from the group consisting of a substituted silane, silica, a silicate, a polysiloxane, and mixtures thereof.
61. The method of any of the preceding paragraphs, wherein said coupling agent comprises a substituted silane selected from the group consisting of a ureido substituted silane, an amino substituted silane, a sulfur substituted silane, an epoxy substituted silane, a methacryl substituted silane, a vinyl substituted silane, an alkyl substituted silane, a haloalkyl substituted silane, and mixtures thereof
62. The method of any of the preceding paragraphs, wherein said substituted silane comprises a ureido substituted silane or an amino substituted silane.
63. The method of any of the preceding paragraphs, wherein said substituted silane is selected from the group consisting of ureidopropyltrimethoxysilane, ureidopropyltriethoxysilane, aminopropyltrimethoxysilane, aminopropyltriethoxysilane, and an oligomeric aminoalkylsilane.
64. The method of any of the preceding paragraphs wherein, in said depressant, said resin comprises from about 0.1 wt-% to about 10 wt-% of said polysaccharide, on a dry solids basis.
65. A method for purifying an aqueous liquid suspension comprising a solid contaminant, the method comprising:
   (a) treating the liquid suspension with a polysaccharide that is cross linked with a resin having azetidinium functional groups and
   (b) removing, either after or during the treating step, (1) at least a portion of said solid contaminant in a contaminant-rich fraction or (2) a purified liquid.
66. The method of any of the preceding paragraphs, wherein said treating step (a) comprises flocculating said portion of said solid contaminant.
67. The method of any of the preceding paragraphs, wherein said removing step (b) comprises sedimentation, flotation, or filtration.
68. The method of any of the preceding paragraphs, wherein said liquid suspension comprises a water-based oil well drilling fluid.
69. The method of any of the preceding paragraphs, comprising removing a purified drilling fluid for reuse in oil well drilling.
70. The method of any of the preceding paragraphs, wherein said solid contaminant comprises sand or clay.
71. The method of any of the preceding paragraphs, wherein said aqueous liquid suspension is a clay-containing effluent slurry from a phosphate production facility.
72. The method of any of the preceding paragraphs, wherein step (b) comprises removing purified water for reuse in phosphate production.
73. The method of any of the preceding paragraphs, wherein said aqueous liquid suspension is a coal-containing suspension and wherein, in step (b), a coal-rich fraction is removed by filtration.
74. The method of any of the preceding paragraphs, wherein said aqueous liquid suspension comprises sewage.
75. The method of any of the preceding paragraphs, wherein step (b) comprises removing purified water by sedimentation.
76. The method of any of the preceding paragraphs further comprising, after removing purified water, further treating said purified water in the presence of microorganisms and said polysaccharide to reduce the biochemical oxygen demand of said purified water.
77. The method of any of the preceding paragraphs, wherein said aqueous liquid suspension comprises a pulp or paper mill effluent.
78. The method of any of the preceding paragraphs, wherein said solid contaminant comprises a cellulosic material.
79. The method of any of the preceding paragraphs, wherein step (b) comprises removing purified water.
80. The method of any of the preceding paragraphs, wherein said aqueous liquid suspension is a bitumen production process intermediate or effluent slurry comprising sand.
81. The method of any of the preceding paragraphs, wherein said purified liquid is drinking water.
82. The method of any of the preceding paragraphs, wherein said polysaccharide is modified with a coupling agent.
83. The method of any of the preceding paragraphs, wherein said coupling agent is selected from the group consisting of a substituted silane, silica, a silicate, a polysiloxane, and mixtures thereof.
84. The method of any of the preceding paragraphs, wherein said coupling agent comprises a substituted silane selected from the group consisting of a ureido substituted silane, an amino substituted silane, a sulfur substituted silane, an epoxy substituted silane, a methacryl substituted silane, a vinyl substituted silane, an alkyl substituted silane, a haloalkyl substituted silane, and mixtures thereof
85. The method of any of the preceding paragraphs, wherein said substituted silane comprises a ureido substituted silane or an amino substituted silane.
86. The method of any of the preceding paragraphs, wherein said substituted silane is selected from the group consisting of ureidopropyltrimethoxysilane, ureidopropyltriethoxysilane, aminopropyltrimethoxysilane, aminopropyltriethoxysilane, and an oligomeric aminoalkylsilane.

87. The method of any of the preceding paragraphs wherein, in said depressant, said resin comprises from about 0.1 wt-% to about 10 wt-% of said polysaccharide, on a dry solids basis.

88. A method for purifying water comprising a metallic cation, the method comprising:
(a) treating the water with a polysaccharide that is cross linked with a resin having azetidinium functional groups and
(b) removing at least a portion of the metallic cation by filtration to yield purified water.

89. The method of any of the preceding paragraphs, wherein the removing step comprises membrane filtration.

90. The method of any of the preceding paragraphs, wherein said metallic cation is selected from the group consisting of $As^{+5}$, $Pb^{+2}$, $Cd^{+2}$, $Cu^{+2}$, $Mn^{+2}$, $Hg^{+2}$, $Zn^{+2}$, $Fe^{+2}$, and mixtures thereof 91. The method of any of the preceding paragraphs, wherein said polysaccharide is further modified with an anionic functional group.

92. The method of any of the preceding paragraphs, wherein said polysaccharide is modified with a coupling agent.

93. The method of any of the preceding paragraphs, wherein said coupling agent is selected from the group consisting of a substituted silane, silica, a silicate, a polysiloxane, and mixtures thereof.

94. The method of any of the preceding paragraphs, wherein said coupling agent comprises a substituted silane selected from the group consisting of a ureido substituted silane, an amino substituted silane, a sulfur substituted silane, an epoxy substituted silane, a methacryl substituted silane, a vinyl substituted silane, an alkyl substituted silane, a haloalkyl substituted silane, and mixtures thereof 95. The method of any of the preceding paragraphs, wherein said substituted silane comprises a ureido substituted silane or an amino substituted silane.

96. The method of any of the preceding paragraphs, wherein said substituted silane is selected from the group consisting of ureidopropyltrimethoxysilane, ureidopropyltriethoxysilane, aminopropyltrimethoxysilane, aminopropyltriethoxysilane, and an oligomeric aminoalkylsilane.

97. The method of any of the preceding paragraphs wherein, in said depressant, said resin comprises from about 0.1 wt-% to about 10 wt-% of said polysaccharide, on a dry solids basis.

98. A method for purifying a coal ore, the method comprising:
treating an aqueous slurry of said coal ore with a depressant prior to or during a size or density classification operation which recovers, from said ore, purified coal having, relative to said coal ore, a reduced amount of an impurity selected from the group consisting of mercury, nitrogen, sulfur, silicon, ash, and pyrite, wherein said impurity is measured on a volatile free weight basis,
wherein said depressant comprises a modified base resin, wherein a base resin comprising a reaction product of a primary or a secondary amine and an aldehyde is modified with a coupling agent.

99. The method of any of the preceding paragraphs, wherein said purified coal has, relative to said coal ore, a reduced amount of moisture or an increased BTU value.

100. The method of any of the preceding paragraphs, wherein said purified coal has, relative to said coal ore, a reduced amount of all impurities selected from the group consisting of mercury, nitrogen, sulfur, silicon, and pyrite.

101. The method of any of the preceding paragraphs, wherein said reduced amount is less than an amount in a purified reference coal recovered in said size or density classification operation, but without treating said aqueous slurry with said depressant.

102. The method of any of the preceding paragraphs, wherein said size or density classification operation is selected from the group consisting of a cyclone separation, a heavy medium separation, filtration, screening, and combinations thereof.

103. A method of controlling dust emissions from a surface, the method comprising applying the aqueous binder composition of claim 1 to said surface.

In another embodiment, the present invention is described as:

1) A modified polysaccharide, wherein the polysaccharide is modified by imparting having azetidinium functionality to a polysaccharide not comprising azetidinium functionality.

2) The modified polysaccharide of any of the preceding paragraphs, wherein the azetidinium functionality is imparted by combining from about 0.1 to about 10% of a resin comprising azetidinium functionality with a polysaccharide not having azetidinium functionality.

3) The modified polysaccharide of any of the preceding paragraphs, wherein the modified polysaccharide comprises one or more of starch, guar gum, alginate or derivatives thereof 4) The modified polysaccharide of any of the preceding paragraphs, wherein the resin comprises a reaction product of polyamidoamine and halohydrin.

5) The modified polysaccharide of any of the preceding paragraphs wherein the halohydrin comprises epichlorohydrin.

6) The modified polysaccharide of any of the preceding paragraphs wherein the polyamidoamine comprises the reaction product of polyamine and polycarboxylic acid.

7) Use of the modified polysaccharide of any of the preceding paragraphs in a separation process.

8) The use of any of the preceding paragraphs, wherein the separation process comprises one or more of:
a) removal of one or more solid materials from a liquid;
b) beneficiation of an ore;
c) removal of metallic ions from a liquid;
d) separation of oil from bitumen; and
e) removal of mercury from synthetic gypsum.

9) The use of any of the preceding paragraphs, wherein the separation process comprises beneficiation of ore, and wherein the process comprises separating from the ore one or more of sand, clay, an iron oxide, a titanium oxide, iron-bearing oxide, mica, ilmenite, tourmaline, an aluminum silicate, calcite, dolomite, anhydrite, ferromagnesian, feldspar, calcium magnesium carbonate, igneous rock and soil.

10) The use of any of the preceding paragraphs, wherein the separation process comprises beneficiation of ore, wherein the beneficiation purifies and recovers, from the ore, a value mineral or metal selected from the group consisting of phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate.

11) The use of any of the preceding paragraphs, wherein the separation process comprises removal of one or more solid materials from a liquid, and wherein the separation process comprises flocculation of the solid from the liquid, thereby providing at portion of the solid material in a solid rich fraction and a purified liquid.

12) The use of any of the preceding paragraphs, wherein the separation process comprises removal of one or more solid materials from a liquid, and wherein the separation process comprises one or more of sedimentation, flotation or filtration.

13) The use of any of the preceding paragraphs, wherein the separation process comprises removal of one or more solid materials from a liquid, wherein the liquid comprises one or more of a pulp or paper mill effluent, sewage, water-based oil well drilling fluid, coal-containing suspension and clay-containing effluent slurry from a phosphate processing facility.

14) The use of any of the preceding paragraphs, wherein the purified liquid comprises water.

15) The use of any of the preceding paragraphs, wherein the separation process comprises removal of one or more metallic ions from a liquid, and wherein the metallic ion comprises $As^{+5}$, $Pb^{+2}$, $Cd^{+2}$, $Cu^{+2}$, $Mn^{+2}$, $Hg^{+2}$, $Zn^{+2}$, $Fe^{+2}$.

16) The use of any of the preceding paragraphs, wherein the separation process comprises removing mercury from synthetic gypsum, wherein the synthetic gypsum is derived from desulfurization of flue gas from a coal-burning power plant.

17) Use of the modified polysaccharide of any of the preceding paragraphs for one or more of dust control, erosion control or hydroseeding.

18) The use of any of the preceding paragraphs, comprising applying the modified polysaccharide of claim 1 to a surface of a particulate solid.

19) A solid material combined with the modified polysaccharide of any of the preceding paragraphs.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

What is claimed is:

1. A binder composition, comprising:
   a polysaccharide; and
   a resin having azetidinium functional groups, wherein the resin dry solids content is from about 0.1 wt-% to about 10 wt-% of the polysaccharide dry solids content and wherein the binder composition is spray dried to provide an overall solids content of 5 wt % to 80 wt %, based on the combined weight of the polysaccharide dry solids and the resin dry solids.

2. The composition of claim 1, wherein the polysaccharide is selected from the group consisting of starch, guar gum, and alginate.

3. The composition of claim 1, wherein said resin having azetidinium functional groups has a dry solids content from about 1 wt % to about 6 wt %, based on said polysaccharide dry solids content.

4. The composition of claim 1, wherein said polysaccharide is starch.

5. The composition of claim 1, wherein said resin is a reaction product of a polyamidoamine and a halohydrin.

6. The composition of claim 5, wherein said halohydrin is epichlorohydrin.

7. A binder and substrate system, comprising:
   the binder composition of claim 1; and
   a solid component.

8. The binder and substrate system of claim 7, wherein the solid component represents from about 85 wt % to about 98 wt % of the dry solids content of said binder and substrate system.

9. The binder and substrate system of claim 7, wherein said solid component is seed, mill scale, or dust particles.

10. The composition of claim 1, wherein the polysaccharide and resin forms a bound matrix, and wherein the bound matrix is formed by heating or drying the binder composition and a solid component.

11. A binder for mill scale or hydroseeding, comprising a polysaccharide selected from the group consisting of starch, guar gum, alginate, and derivatives thereof, wherein said polysaccharide is crosslinked with a resin having azetidinium functional groups, wherein said resin is the reaction product of a polyamidoamine and a halohydrin, and wherein said binder is obtained by crosslinking said polysaccharide and said resin in a composition having a resin dry solids content of about 1 wt-% to about 6 wt-% of a polysaccharide dry solids content and spray dried to provide an overall solids content of 5 wt % to 80 wt %, based on the combined weight of the polysaccharide dry solids and the resin dry solids.

12. The binder composition of claim 1, wherein the binder composition is spray dried to provide an overall solids content of 20 wt % to 65 wt %, based on the combined weight of the polysaccharide dry solids and the resin dry solids.

13. The binder composition of claim 1, wherein the binder composition is spray dried to provide an overall solids content of 10 wt % to 35 wt %, based on the combined weight of the polysaccharide dry solids and the resin dry solids.

14. The binder composition of claim 1, wherein the binder composition is spray dried to provide an overall solids content of 5 wt % to 50 wt %, based on the combined weight of the polysaccharide dry solids and the resin dry solids.

15. The binder composition of claim 1, wherein the polysaccharide and the resin having azetidinium functional groups are crosslinked.

16. The binder composition of claim 1, wherein the polysaccharide is modified with a silane coupling agent.

17. The binder composition of claim 16, wherein the silane coupling agent is selected from the group consisting of ureidopropyltrimethoxysilane, ureidopropyltriethoxysilane, aminopropyltrimethoxysilane, aminopropyltriethoxysilane, aminopropylmethyldiethoxysilane, aminopropylmethyldimethoxysilane, aminoethylaminopropyltrimethoxysilane, aminoethyiaminopropyttriethoxysilane, amino ethylaminopropylmethyldimethoxysilane, diethylenetriaminopropyltrimethoxysilane, diethylenetriaminopropyltriethoxysilane, diethylenetriaminopropylmethyldimethoxysilane, diethylenetriaminopropylmethyldiethoxysilane, cyclohexylaminopropyltrimethoxysilane, hexanediaminomethyltriethoxysilane, anilinomethyltrimethoxysilane, anilinomethyltriethoxysilane, diethylaminomethyltriethoxysilane, (diethylaminomethyl)methyldiethoxysilane, methylaminopropyltrimethoxysilane, bis(triethoxysilylpropyl)tetrasulfide, bis(triethoxysilylpropyl)disulfide, mercaptopropyltrimethoxysilane, mercaptopropyltriethoxysilane, mercaptopropylmethyldimethoxysilane, 3-thiocyanatopropyltriethoxysilane, isocyanatopropyl triethylsilane, glycidoxypropyltrimethoxysilane, glycidoxypropyltriethoxysilane, glycidoxypropylmethyldiethoxysilane, glycidoxypropylmethyldimethoxysilane, methacryloxypropyltrimethoxysilane, methacryloxypropyltriethoxysilane, methacryloxypropylmethyldimethoxysilane, chloropropyltrimethoxysilane, chloropropyltriethoxysilane, chloromethyltriethoxysilane, chloromethyltrimethoxysilane, dichloromethyltriethoxysilane, vinyltrimethoxysilane, vinyltriethoxysilane, vinyltris(2-methoxyethoxy)silane, vinyltriacetoxysilane, alkylmethyltrimethoxysilane, vinylbenzylaminotrimethoxysilane, (3,4-epoxycyclohexyl)ethyltrimethoxysilane, aminopropyltriphenoxysilane, aminopropyltribenzoyloxysilane, aminopropyltrifurfuroxysilane, aminopropyltri(o-chlorophenoxy)silane, aminopropyltri(p-chlorophenoxy)silane aminopropyltri(tetrahydrofurfuroxy)silane, ureidosilane, mercaptoethyltriethoxysilane, vinyltrichlorosilane, and methacryloxypropyltri(2-methoxyethoxy)silane.

18. A binder composition, comprising:
   a polysaccharide;
   a solid particulate; and
   a resin having dry solids and one or more azetidinium functional groups, wherein the resin dry solids content is from about 0.1 wt % to about 10 wt %, based on the polysaccharide dry solids content, and the solid particulate is about 85 wt % to about 98 wt % of the dry solids content of the binder composition.

19. The binder composition of claim 18, wherein the solid particulate is selected from the group consisting of seeds, fertilizer pellets, mulch, refuse, compost, and solid waste.

* * * * *